(12) United States Patent
Scott et al.

(10) Patent No.: US 7,772,299 B2
(45) Date of Patent: Aug. 10, 2010

(54) METHOD FOR FORMING FLAME-RETARDANT CLAY-POLYOLEFIN COMPOSITES

(75) Inventors: Susannah Scott, Goleta, CA (US);
Brian Peoples, Goleta, CA (US);
Cathleen M. Yung, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/507,505

(22) Filed: Jul. 22, 2009

(65) Prior Publication Data
US 2009/0318587 A1   Dec. 24, 2009

Related U.S. Application Data

(60) Division of application No. 11/544,129, filed on Oct. 6, 2006, which is a continuation-in-part of application No. 11/451,199, filed on Jun. 12, 2006.

(51) Int. Cl.
*C08J 3/22* (2006.01)
*C08K 3/34* (2006.01)

(52) U.S. Cl. .................. 523/351; 524/445; 524/570

(58) Field of Classification Search ................ 523/351; 524/445, 570
See application file for complete search history.

(56) References Cited

U.S. PATENT DOCUMENTS

| | | | |
|---|---|---|---|
| 4,785,044 A | 11/1988 | Kannankeril | |
| 5,171,910 A * | 12/1992 | Horvath et al. | 585/266 |
| 5,308,811 A | 5/1994 | Suga et al. | |
| 6,451,728 B1 | 9/2002 | Matsui et al. | |
| 6,500,892 B1 | 12/2002 | Bishop et al. | |
| 6,646,072 B2 | 11/2003 | Klendworth et al. | |
| 6,649,713 B2 | 11/2003 | Tang et al. | |
| 6,838,508 B2 | 1/2005 | Hsiao et al. | |
| 2004/0171479 A1 | 9/2004 | Bazan et al. | |
| 2004/0266934 A1 | 12/2004 | Klendworth et al. | |
| 2006/0122308 A1 | 6/2006 | Wermter et al. | |
| 2007/0185343 A1 | 8/2007 | Verpoort et al. | |

FOREIGN PATENT DOCUMENTS

| | | | |
|---|---|---|---|
| EP | 0 683 180 A2 | 11/1995 | |
| WO | WO99/47598 | 9/1999 | |
| WO | WO 00/69959 | * 11/2000 | |
| WO | WO01/30864 | 5/2001 | |
| WO | WO/01/30864 A2 | 5/2001 | |

OTHER PUBLICATIONS

T.G. Gopakumar, J.A. Lee, M. Kontopoulou and J.S. Parent, *Influence of clay exfoliation on the physical properties of montmorillonite/polyethylene composites*, Polymer 43 (2002) 5483-5491.

S.S. Ray and M. Okamoto, Polymer/layered silicate nanocomposites: a review from preparation to processing, Prog. Polym. Sci. 28 (2003) 1539-1641.

K Weiss, C. Wirth-Pfeifer, M. Hofmann, S. Botzenhardt, H. Lang, K Bruning and E. Meichel, *Polymerisation of ethylene or propylene with heterogeneous metallocene catalyst on clay minerals*, J. Mol. Catal. A Chem. 182/183 (2002) 143-149.

E.G. Howard, R.D. Lipscomb, R.N. MacDonald, B.L. Glazar, C.W. Tullock and J.W. Collette, *Homogeneous Composites of Ultrahigh Molecular Weight Polyethylene and Minerals. 1. Synthesis*, Ind. Eng. Chem. Prod. Res. Dev. 20 (1981) 421-428.

G.G. Hlatky, *Heterogeneous Single-Site Catalysts for Olefin Polymerization*, Chem. Rev. 1000 (2000) 1347-1376.

J. Tudor, L Willington, D. O'Hare and B. Royan, *Intercalation of catalytically active metal complexes in phyllosilicates and their application as propene polymerisation catalysts*, Chem. Commun. (1996) 2031-2032.

Y. Ishihama, E. Isobe, Y. Maruyama, T. Sagae, Y. Suga and Y. Uehara, *Catalyst for polymerizing an olefin and method for polymerizing the olefin*, see EP Patent 0683180 (1995).

T. Sun and J.M. Garces, *High-Performance Polypropylene-clay Nanocomposites by In-situ Polymerization with Metallocene/Clay Catalysts*, Adv. Mater. 14 (2002) 128-130.

J.S. Bergman, H. Chen, E.P. Giannelis, M.G. Thomas and G.W. Coates, *Synthesis and characterization of polyolefin-silicate nanocomposites: a catalyst intercalation and in situ polymerization approach*, Chem. Commun. (1999) 2179-2180.

Y.-H. Jin, H.-J. Park, S.-S. Im, S.-Y. Kwak and S. Kwak, *Polyethylene/Clay Nanocomposite by In-Situ Exfoliation of Montmorillonite During Ziegler-Natta Polymerization of Ethylene*, Macromol. Rapid Commun. 23 (2002) 135-140.

J. Heinemann, P. Reichart, R. Thomann and R. Mulhaupt, *Polyolefin nanocomposites formed by melt compounding and transition metal catalyzed ethene homo-and copolymerization in the presence of layered silicates*, Macromol. Rapid Commun. 20 (1999) 423-430.

P. Dubois, M. Alexandre and R. Jerome, *Polymerization-Filled Composites and Nanocomposites by Coordination Catalysis*, Macromol. Symp. 194 (2003) 13-26.

M. Alexandre, P. Dubois, R. Jerome, M. Gareia-Marti, T. Sun, J.M. Garces, D.M. Millar and A. Kuperman, *Polyolefin Nanocomposites*, See Patent WO 99/47598 (1999).

(Continued)

*Primary Examiner*—Robert D. Harlan
(74) *Attorney, Agent, or Firm*—Berliner & Associates (57) ABSTRACT

A method for forming polyolefin/clay composites by olefin polymerization which can be used as flame retardants in which at least one filler is combined with an early or late transition metal first catalyst component that becomes activated for olefin polymerization when in contact with the treated filler. An olefin is contacted by the activated catalyst-filler combination either (a) in the absence of an alkylaluminum second catalyst component or (b) in the presence an alkylaluminum second catalyst component when the first catalyst component is an early transition metal catalyst, whereby to form an clay-polyolefin composite incorporating platelets of said filler. The filler is preferably clay, exemplified by montmorillonite and chlorite. The first catalyst component is preferably a non-metallocene catalyst. A predetermined amount of one or more olefinic polymers can also be blended with a masterbatch to obtain a composite having a desired amount of loading.

20 Claims, 6 Drawing Sheets

OTHER PUBLICATIONS

H.G. Jeon, H.-T. Jung, S.W. Lee and S.D. Hudson, *Morphology of polymer/silicate nanocomposites*, Polymer Bull. 41 (1998) 107-113.

A. Usuki, M. Kato, A. Okada and T. Kurauchi, *Synthesis of Polypropylene-Clay Hybrid*, J. Appl. Polym. Sci. 63 (1997) 137-139.

M. Kawasumi, N. Hasegawa, M. Kato, A. Usuki and A. Okada, *Preparation and Mechanical Properties of Polypropylene-Clay Hybrids*, Macromolecules 30 (1997) 6333-6338.

N. Hasegawa, M. Kawasumi, M. Kato, A. Usuki and A. Okada, *Preparation and Mechanical Properties of Polypropylene-Clay Hybrids using a Maleic Anhydride-Modified Polypropylene Oligomer*, J. Appl. Polym. Sci. 67 (1998) 87-92.

D. Kaempfer, R. Thomann and R. Mulhaupt, *Melt compounding of syndiotactic polypropylene nanocomposites containing organophilic layered silicates and in situ formed core/shell nanopartides*, Polymer 43 (2002) 2909-2916.

P.H. Nam, P. Maiti, M. Okamoto, T. Kotaka, N. Hasegawa and A. Usuki, *A hierarchical structure and properties of intercalated polypropylene/clay nanocomposites*, Polymer 42 (2001) 9633-9640.

K.H. Wang, M.H. Choi, C.M. Koo, Y.S. Choi and I.J. Chung, *Synthesis and characterization of maleated polyethylene/clay nanocomposites*, Polymer 42 (2001) 9819-9826.

N. Hasegawa, M. Okamoto, M. Kawasumi, M. Kato, A. Tsukigase and A. Usuki, *Polyolefin-clay hybrids based on modified polyolefins and organophilic clay*, Macromol. Mater. Eng. 280/281 (2000) 76-79.

E. Manias, A. Touny, L. Wu, K Strawhecker, B. Lu and T.C. Chung, *Polypropylene/Montmorillonite nanocomposites. Review of the Synthetic routes and Materials Properties*, Chem. Mater. 13 (2001) 3516-3523.

Z.M. Wang, H. Nakajima, E. Manias and T.C. Chung, *Exfoliated PP/Clay Nanocompsoites Using Ammonium-Terminated PP as the Organic Modification for Monmorillonite*, Macromolecules 36 (2003) 8919-8922.

S.-S. Hou and K. Schmidt-Rohr, *Polymer-Clay Nanocomposites from Directly Micellized Polymer/Toluene in Water and Their Characterization by WAXD and Solid-'State NMR Spectroscopy*, Chem. Mater. 15 (2003) 1938-1940.

T. Sun, J.M. Garces and Z.R. Jovanovic, *Nanocomposite Polymers*, see International Patent Application Publication No. WO 01/30864 (2001).

B.Y. Lee, G.C. Bazan, J. Vela, Z.J.A. Komon and X. Bu, α-*Iminocarboxamidato-Nickel (II) Ethylene Polymerization Catalysts*, J. Am. Chem. Soc. 123 (2001) 5352-5353.

Bartholmai, M.; Schartel, B. *Polym. Adv. Technol.* 2004, 15, 355.

Beyer, G. Plastics Additives & compounding, 2002, 22.

Blumstein, A. *J. Polym. Sci.* 1965, A 3, 2665.

Burnside, S.D.; Giannelis, E.P. *Chem. Mater.*, 1995, 7, 1597.

Giannelis, E. *Adv. Mater.* 1996, 8, 29.

Lee,, J.; Takekoshi, T.; Giannelis, E. *Mater. Res. Soc. Symp. Proc.* 1997, 457, 513.

Zanetti, M.; Camino, G.; Reichart, P.; Mulhaupt, R. *Macromol. Rapid Commun.* 2001, 22, 176.

Qin, H.; Zhang, S.; Zhao, C.; Feng, M.; Yang, M.; Shu, Z.;Yang, S. *Polym. Degrad. Stab.* 2004, 85, 807.

Morgan, A. B.; Harris, R. H., Jr.; Kashiwagi, T,; Chyall, L J.;Gilman, J. W. *Fire Mater.* 2002, 26, 247.

Zhu, J.; Uhl, F.M.; Morgan, A.B.; Wilkie, C.A. *Chem. Mater.*2001, 13, 4649.

Zhao, C.; Qin, H.; Gong, F.; Feng, M.; Zhang S.; Yang, M. *Polym. Degrad. Stab.* 2005, 87, 183.

Gilman, J.W. *Appl. Clay Sci.* 1999, 15, 31.

Babrauskas, V.; Peacock, R.D. *Fire Safety Journal* 1992, 18, 255-261.

Gilman, J.W.; Jackson, C.L.; Morgan, A.B.; Harris, R., Jr.; Manias, E.; Giannelis, E. P.; Wuthenow, M.; Hilton, D.; Phillips, S. H. *Chem. Mater.* 2000, 12, 1866.

Yang, F.; Yngard, R.; Nelson, G. L. *J. Fire Sci.* 2005, 23, 209.

\* cited by examiner

Figure 1

| sample | wt.% clay | time required to self-extinguish (min:sec) | total burn time (min:sec) | clay and method specifications |
|---|---|---|---|---|
| 1 | 5.4 | 0:40 | -- | LiMMT/TIBA in situ with prepolymerization |
| 2 | 11.5 | 1:12 | -- | LiMMT/TIBA in situ with prepolymerization |
| 3 | 9.3 | 1:00 | -- | TMS-LiMMT/TIBA in situ with prepolymerization |
| 4 | 14.9 | 1:52 | -- | TMS-LiMMT in situ with prepolymerization |
| 5 | 12.9 | 1:28 | | TIBA/chlorite in situ polymerization |
| 6 | 0 | -- | 7:32 | pure PE catalyst activated by $B(C_6F_5)_3$ |
| 7 | 5 | -- | 4:16 | LiMMT/TIBA/PE masterbatch blend |
| 8 | 10 | -- | 4:16 | LiMMT/TIBA/PE masterbatch blend |
| 9 | 5 | -- | 3:00 | TMS-LiMMT/TIBA masterbatch blend |
| 10 | 5 | -- | 3:00 | TMS-LiMMT masterbatch blend |

| sample | wt.% clay | time required to self-extinguish (min: sec) | total burn time (min: sec) | clay and method specifications |
|---|---|---|---|---|
| 11a | 0 | -- | 1:44 (trial 1) | iPP |
| b | 0 | | 3:22 (trial 2) | |
| 12 | 20 | -- | 2:38 | LiMMT/TIBA in situ polymerization |
| 13 | 30 | 1:04 | -- | TMS-LiMMT/TIBA in situ polymerization |
| 14 | 5 | -- | 13:36 | LiMMT/TIBA/PP masterbatch blend |
| 15 | 5 | -- | 11:56 | TMS-LiMMT/PP masterbatch blend |
| 16 | 5 | 3:22 | -- | TMS-LiMMT/TIBA/PP masterbatch blend |

Figure 9: Powder XRD

Figure 10: TEM (all scale markers 200 nm)

Figure 11

METHOD FOR FORMING FLAME-RETARDANT CLAY-POLYOLEFIN COMPOSITES

CROSS-REFERENCE TO CO-PENDING APPLICATION

This application is a divisional application of U.S. patent application Ser. No. 11/544,129 filed on Oct. 6, 2006, which is a continuation-in-part application of U.S. patent application Ser. No. 11/451,199 filed Jun. 12, 2006, both of which are incorporated by reference in their entirety.

FIELD OF INVENTION

The invention relates to the formation of flame-retardant clay-polyolefin composites, and more particularly, to the formation of flame-retardant clay-polyolefin composites using non-metallocene catalysts.

BACKGROUND OF THE INVENTION

Nanocomposites are materials containing two or more chemically dissimilar phases in which at least one of the phases has a nanoscale dimension. Nanocomposites consisting of exfoliated clay lamellae dispersed in an organic polymer matrix exhibit enhanced physical properties relative to virgin polymer, or to conventional macro- or microcomposites containing other inorganic fillers (e.g., glass fiber, talc, mica, carbon black) [1]. The enhancements may include improved tensile and flexural properties, increased storage modulus, increased heat distortion temperature, decreased flammability [32], decreased gas permeability, reduced visual defects and improved optical transparency [2].

The clay filler achieves these improvements at very low clay loadings ($\leq 5$ wt %), thus the material retains desirable polymer properties such as light weight, low cost, solution/melt processability and recyclability. Uses for these nanocomposite materials include molded automotive and appliance components (such as body panels, under hood components, electrical/electronic parts and insulation, power tool housings) and furniture (such as seat components, consoles), medical tubing, abrasion and chemical resistant coatings, food packaging materials (such as transparent stretch films) and barrier layers for beverage bottles.

Clays such as kaolinite, hectorite and montmorillonite (MMT) have been investigated as mechanical supports for single-site ethylene polymerization catalysts [3]. Usually the support is also treated with an organoaluminum co-catalyst, such as a trialkylaluminum or an alkylaluminoxane, which serves to remove adsorbed water and passivate the clay surface. It has also been suggested that alkylaluminum compounds can cause delamination of kaolinite [4]. In general, the catalyst is adsorbed onto the co-catalyst-modified clay, where it is activated in situ by the co-catalyst surface layer [5], [6]. Olefin uptake by the supported catalyst results in controlled particle growth, which is a desirable behavior in polymerization reactor engineering.

Supporting metallocene catalysts on clays results in modest activity for ethylene polymerization [7], even in the absence of alkylaluminum co-catalysts [8]. However these catalyst systems do not generate high quality nanocomposites; the polyethylene they produce contains small clumps of unexfoliated clay.

The desirable physical properties of nanocomposites are observed only when clay sheets are highly dispersed in the polyolefin matrix. The difficulty in making exfoliated clay-polyolefin nanocomposites originates in the immiscibility of strongly associated hydrophilic clay sheets and hydrophobic polyolefin chains. In many varieties of clay, clay layers are negatively charged due to isomorphic substitution of framework ions, generally cations. Interlayer cations provide charge compensation and promote strong interlayer adhesion, which simple mixing with a polyolefin cannot effectively disrupt.

One strategy to make the components of the nanocomposite compatible is to render the clay hydrophobic, by replacing the interlayer ions with surfactants such as long chain alkylammonium, imidazolium or alkylphosphonium cations (typically C18). This procedure generates an organically-modified layered silicate (OMLS). Methods employing an OMLS in the preparation of polyolefin nanocomposites include:

In situ intercalative polymerization, in which a catalyst adsorbed onto the OMLS, causes spontaneous delamination upon addition of monomer. This strategy has been successfully applied to propylene polymerization using a zirconocene catalyst supported on methylaluminoxane (MAO)-treated OMLS [9], and to ethylene polymerization using a Brookhart Pd catalyst supported on OMLS [10]. The Ziegler catalyst $TiCl_4$, grafted onto a hydroxyl-containing surfactant intercalated into MMT, was used for in situ polymerization of ethylene upon activation with triethylaluminum [11]. Silica or titania nanoparticles synthesized in the interlayer spaces of an OMLS by a sol-gel method were treated with an alkylaluminum and a metallocene to create a catalyst system for in situ polymerization [12]. In situ polymerization filling was achieved using MAO-treated clay and metallocene or constrained geometry catalysts with [13] and even without [14], [15] surfactant modification of the clay. In the absence of surfactant, the clay was swollen using an organic solvent.

Solution intercalation, in which high density polyethylene (HDPE) dissolved in a hot xylene/benzonitrile mixture is stirred with dispersed OMLS [16];

Melt intercalation, in which the OMLS is annealed with polymer above the softening point of the latter, either statically or under shear. Since mixing is driven by interactions between the polymer and the clay, this method typically requires a compatibilizer consisting of polymers or oligomers modified with polar sidechains or endgroups. For example, nanocomposite formation was achieved by melt intercalation of propylene oligomers with telechelic OH groups, followed by melt-mixing with unmodified PP [17]. Melt blending of PP and OMLS was achieved using a twin screw extruder in the presence of maleated PP (i.e., functionalized with maleic anhydride side chains, PP-g-MA) as the compatibilizer [18, 19, 20, 21]. A similar strategy was used to make nanocomposites by melt blending of PE-g-MA [22], [23] or EPR-g-MA [23] with OMLS. A semifluorinated surfactant was used to create an OMLS with weaker clay-surfactant interactions and a greater propensity to intercalate unmodified PP [24]. A method involving functionalized surfactants which react to form chemical bonds with the maleated compatibilizer has been described [25]. Direct melt intercalation of ammonium-functionalized polypropylene chains into unmodified MMT was achieved, presumably by direct cation exchange, without intermediate functionalization of the clay with surfactant [26].

Recently, the formation of nanocomposites with unmodified clay was achieved by making the polyolefin component more hydrophilic. In the presence of the surfactant cetyltrimethylammonium bromide, micelles containing polystyrene were formed and adsorbed from solution onto dispersed clay [27].

Also recently, nanocomposite materials have been produced by adding an olefin to a suspension of acid-treated layered silicate treated with a solution of a metallocene polymerization catalyst, causing olefin polymerization to form the nanocomposite polymer [28]. Although described in broad encompassing terms, the specific preparations described by the reference all require the use of a tripropylaluminum co-catalyst added to the slurry formed by mixing 4-tetradecylanilinium-exchanged or HCl-treated clay to dry toluene.

A flame retardant is a material that exhibits either a delay in the start, or a decrease in the rate of propagation, of a fire [30, 31]. Organic polymers can be made flame retardant by incorporating a large quantity (ca. 50 wt %) of an inorganic (e.g., $Mg(OH)_2$) or organic (e.g., brominated polystyrene) filler. Flame retardant properties may be obtained at much lower filler content with nanocomposites. Potential uses for flame retardant nanocomposite materials include molded furniture, automotive parts (such as body panels, under hood components) and appliance components (such as electrical/electronic parts, power tool housings).

The first report of improved thermal stability in a polymer-clay composite involved a polymethylmethacrylate (PMMA)-montmorillonite (MMT) clay system. At 10 wt % clay loading, this material exhibits an increase of 40-50° C. in its thermal decomposition temperature relative to pure PMMA [33]. A nanocomposite prepared by sonication of silanol-terminated polydimethylsiloxane (PDMS) with montmorillonite (10 wt %) decompose at a temperature 140° C. higher than pure PDMS [34]. An increase in the decomposition temperature was observed upon melt intercalation of aliphatic polyimide (PEI-10) into clay [35]. An increase in the thermal decomposition temperature was observed for organically-modified layer silicate (OMLS) nanocomposites with polypropylene-graft-maleic anhydride (PP-g-MA) [30,37], PP [38], and polystyrene (PS) [39,40], when compared to their pure polymer counterparts. In particular, thermogravimetric analysis (TGA) experiments performed under $N_2$ showed the onset temperatures for decomposition of polyethylene (PE)/OMLS nanocomposites are approximately 20-30° C. higher than for pure PE [41].

Flammability properties: Cone calorimetry measurements have demonstrated decreased flammability for many types of polymer-clay nanocomposites. The heat release rate (HRR), especially the peak HRR, is an important parameter in evaluating fire safety [42,43]. The reduction in HRR and peak HRR shown by many polymer-clay nanocomposites suggest a decrease in their flammability relative to the pure polymers. Delaminated clay-nylon-6 and -nylon-12 nanocomposites, as well as intercalated clay-PS and -PP nanocomposites, have shown substantial decreases in HRR [44]. Several PP and PP-g-MA nanocomposites also exhibit a reduction in HRR as measured by cone calorimetry [30,37,38,45]. The peak HRR of PE nanocomposites was reduced by 54% [41].

A more severe test of non-flammability is the capacity of a burning material to self-extinguish. Self-extinguishing behavior of PEI-clay nanocomposites has been reported [36], however there is no report of this behavior in polyolefin-clay nanocomposites. Similarly, no report has shown that a polyolefin/clay nanocomposite has achieved a UL94 V0 rating, which is a practical flame retardant material according to the Underwriter's Laboratory's fire test protocol [46].

BRIEF SUMMARY OF THE INVENTION

The present invention provides a flame retardant composite and a method for forming flame retardant composite materials containing a filler, which is accomplished with either an early or late transition metal first catalyst component, without the use of alkylammonium modifiers to separate the filler layers, and without the use of an alkylaluminum second catalyst component. In other embodiments, an alkylaluminum second catalyst component can be used with an early transition metal first catalyst component.

The filler is selected from the group consisting of silicates and non-silicate compounds. The invention proceeds by combining the filler with a first catalyst component that becomes activated for olefin polymerization when in contact with the filler. An olefin is contacted by the activated catalyst-filler combination in the absence of an alkylaluminum second catalyst component to form a composite polymer containing the filler. The first catalyst component can be selected to provide a high or low melting point polymer. One class of preferred first catalyst components used particularly without the need or use of an alkylaluminum second catalyst component is a non-metallocene catalyst, most preferably a nickel complex bearing an α-iminocarboxamidato ligand. Another preferred first catalyst component, one that can be used with or without an alkylaluminum second catalyst component, is tetrabenzylzirconium.

In a particular embodiment, sufficient silicate is used to constitute at least 30 weight % of the composite material to prepare a high silicate-loaded composite masterbatch. A predetermined amount of one or more polyolefins can then be blended with the masterbatch to obtain a composite polymer having a desired amount of silicate loading. In this invention, the method to prepare a composite by blending the said masterbatch with a predetermined amount of polyolefins is defined as the "masterbatch method."

In specific embodiments, the silicate material is a clay. In a more specific embodiment, the invention achieves high dispersion of montmorillonite clay platelets in a polyethylene or polypropylene matrix by in situ polymerization of ethylene or propylene. The clay may first be acid-treated, causing disruption of its layered structure. The acid-treated clay is then treated with an organic solvent solution of a polymerization catalyst, which contains Ni, an α-iminocarboxamidato ligand and an alkyl ligand. Upon exposure to olefin, a polyolefin matrix is formed in which the embedded clay layers are mostly separated.

In particular embodiments, capped clay can be used to polymerize olefin in the presence or absence of an organoaluminum second catalyst component. The capping of the Brønsted acid sites on the clay essentially passivates the clay surface prior to the deposition of catalyst.

The invention allows a new flame retardant composite and preparation of flame retardant clay-polyolefin composites which self-extinguish after ignition, and represents a simple, inexpensive, one-pot procedure for making silicate-polymer composites without the need for time-consuming organic modification of the filler material or the use of expensive surfactants. The flame retardant composite in the invention is not limited to a nanocomposite, and a flame retardant composite is also allowed in which the dimension of the dispersed filler is not nano-scale but micron-scale.

With the invention, the use of organic solvents to swell the clay and/or dissolve the polymer is also greatly reduced or eliminated. There is no need for compatibilizers, such as maleated polymers, whose lower molecular weights and lower stability relative to the polyolefin component may result in degradation of composite performance [1]. The composite material can be prepared with or without additional added flame retardants. With late transition metal catalysts, there is no need for organoaluminum activators or other co-catalyst modification or passivation of the surface of the layered filler, since the layered filler itself serves as catalyst activator. The improvements as described herein lead to higher quality and less expensive flame retardant composite polymers.

BRIEF DESCRIPTION OF THE DRAWINGS

For a more complete understanding of the present invention, reference is now made to the following descriptions taken in conjunction with the accompanying drawing in which.

DETAILED DESCRIPTION OF THE INVENTION

The invention provides a flame retardant composite comprised of at least a polyolefin, a layered filler, selected from the group consisting of layered silicates and non-silicate compounds, and a component derived from a complex containing a metal ion and a ligand containing a heteroatom (i.e., the said complex itself or resulting products that are formed in a process in which the said complex undergoes some chemical reactions), or a complex in which the said complex has the formula $MR_x$ where M is an early transition metal, R is an alkyl or substituted alkyl ligand, and x is from 3 to 6.

The invention also provides a flame retardant composite comprised of at least a polyolefin, a layered filler, selected from the group consisting of layered silicates and non-silicate compounds, and an organic compound that can form a radical via pyrolysis or other decomposition process.

The invention provides a method for forming flame retardant clay-polyolefin composites by olefin polymerization in the presence of a filler. Highly exfoliated nanocomposites can also be formed as disclosed in U.S. patent application Ser. No. 11/451,199, filed Jun. 12, 2006, the entirety of which is incorporated herein by reference. However, exfoliation is not necessary for the production of flame retardant composites of the present invention.

The filler is selected from the group consisting of nonlayered or layered silicates and non-silicate compounds, and is combined with a catalyst that becomes activated for olefin polymerization when in contact with the filler. The activated catalyst-filler combination is then contacted with olefin whereby to form a polyolefin composite material incorporating platelets of the filler. The polymerization step can be accomplished without the use of an alkylaluminum second catalyst component. In other embodiments, an alkylaluminum second catalyst component may be used with an early transition metal first catalyst component.

More particularly, the filler and a late transition metal first catalyst component are added to a reactor followed by the addition to the reactor of the olefin. As stated above, in an advantageous departure from the art, the polymerization reaction can be carried out in the absence of an alkylaluminum second catalyst component. This allows significant savings and simplification of the process. Indeed, where the late transition metal first catalyst component is a nickel complex bearing an α-iminocarboxamidato ligand, when trimethylaluminum (a second catalyst component, present in 60-fold excess relative to the first catalyst component) is added as a scavenger to the reactor after addition of the filler and first catalyst component, reactor fouling occurs. A larger excess of trimethylaluminum (350-fold relative to catalyst) inhibits the polymerization. Moreover, when the second catalyst component is added to the clay prior to the addition of the late transition metal first catalyst component, incorporation of the clay into the polymer matrix is compromised, and the material is obtained is not a highly exfoliated nanocomposite.

In particular embodiments, sufficient layered filler is used to constitute at least 30 weight % of the composite material, to prepare a high loaded composite masterbatch. A predetermined amount of one or more olefinic polymers can be blended with the masterbatch to obtain a composite having a desired amount of loading.

As the filler, clay, clay minerals or compounds having a layered crystal structure of e.g. a hexagonal densely packed-type, antimony-type, $CdCl_2$-type or $CdI_2$-type, may be used. Specific examples of clay, clay minerals and layered compounds useful as fillers include kaolin, bentonite, kibushi clay, gairome clay, allophane, hisingerite, pyrophyllite, talc, a mica group, a montmorillonite group, vermiculite, a chlorite group, palygorskite, kaolinite, nacrite, dickite and halloysite.

The silicates to be used as a filler in the present invention may be synthesized products or naturally produced minerals. Specific examples of the silicates include alkaline silicates such as lithium silicate, sodium silicate, and potassium silicate, alkaline earth silicates such as magnesium silicate, calcium silicate, and barium silicate, metal silicates such as aluminium silicate, titanium silicate and zirconium silicate, and natural silicates such as an olivine group such as forsterite and fayalite, a garnet group such as garnet, a phenacite group such as phenacite and willemite, zircon, tricalcium silicate, merrillite, gehlenite, benitoite, beryl, cordierite, a pyroxene group such as enstatite, hypersthene, diopside, spondumene, rhodonite and wollastonite, an amphibole group such as anthophyllite, tremolite and actinolite.

Particularly preferred as fillers are clay or clay minerals, and most preferred are montmorillonite and chlorite. Fillers may be used alone or in combination as a mixture of two or more of them. Flame retardant nano-composites can be formed using montmorillonite, while micro-composites can be formed using chlorite.

The fillers used in this invention may be acid treated. Further, they may be used as they are without subjecting them to any treatment, or they may be treated by ball milling, sieving, acid treatment or the like before use. They may be treated to have water added and adsorbed or may be treated for dehydration by heating before use. They may also be treated to exchange their interlayer cation by organic cation such as onium cations having aliphatic chains. Specific examples of the onium cations include primary to quaternary ammonium cation and phosphonium cation. Specific examples of the aliphatic chains are aliphatic chains which have 6-20 carbon atoms including hexyl, octyl, 2-ethylhexyl, dodecyl, hexadecyl, octadecyl and the like, also the mixture of them such as hydrogenated tallow. Specific examples of the organic cation include hexylammonium, octylammonium, 2-ethylhexylammonium, dodecylammonium, trioctylammonium, dioctadecyldimethylammonium, trioctadecylammonium and the like. They may be used alone or in combination as a mixture of two or more of them.

In one embodiment, the filer material is acidified by contacting it with a Brønsted acid (such as hydrochloric acid, sulfuric acid, or any material which forms a strong acidic aqueous solution). The acid dissolves some of the aluminum present in the clay and thereby partly disrupts the layered structure.

The acid-treated filler is dispersed with a small quantity of solvent (such as toluene), which can be done by any suitable technique, and can use mechanical means if desired or needed such as by sonication or by high shear mixing or wet ball milling.

As indicated, the first catalyst component is preferably a non-metallocene catalyst. A non-metallocene catalyst is comprised of a transition metal ion and a ligand that does not contain a cyclopentadienyl ring The ligand for the said non-metallocene catalyst preferably contains at least one heteroatom. Preferred heteroatoms are the atoms in group 15 and/or group 16 in the Periodic Table. In more detail, nitrogen, oxygen, sulfur, phosphorus, arsenic, and selenium atom are preferred for the heteroatom in the said ligand. There is no limitation to the transition metal ion as long as the said complex based on the metal ion has a function to polymerize α-olefins. An early transition metal or a late transition metal can be used in this invention. A mixture of non-metallocene catalysts can also be used in this invention.

In a particular embodiment, the first catalyst component is a late transition metal catalyst, a nickel complex bearing an α-iminocarboxamidato ligand. The acid-treated clay activates late transition metal catalysts containing α-iminocarboxamidato ligands, i.e., catalysts from the family LNi(R)(S), where L is an α-iminocarboxamidato ligand, R is an alkyl group (e.g., CH$_2$Ph) and S is an ancillary ligand (e.g., PMe$_3$) [28].

Most preferably, the nickel catalyst is a complex having the general formula I, II, III, IV or V:

(I)

(II)

(III)

(IV)

and (V)

wherein:
M is Ni, Pt, Pd;
A is a π-allyl, a substituted π-allyl, a π-benzyl, a substituted π-benzyl, benzoyl or picolino ligand;
X is N, P or CH;
Y is O, CH$_2$, or S;
Z is O or S
L is N or P or a structure that is capable of being a neutral two electron donor ligand;
L$^1$ is a neutral monodentate ligand and L$^2$ is a monoanionic monodentate ligand, or L$^1$ and L$^2$ taken together are a monoanionic bidentate ligand, provided that said monoanionic monodentate ligand or said monoanionic bidentate ligand is capable of adding to said olefin;
B is a bridge connecting covalently an unsaturated carbon and L;
R$^1$, R$^2$, R$^{3A}$ and R$^{3B}$ are the same or different and are each independently hydrogen, hydrocarbyl group, or substituted hydrocarbyl bearing functional group;
the designation:

----- is a single or double bond; and
R$^{3B}$ is nothing when B is connected to L by a double bond.

A particularly preferred catalyst is (N-(2,6-diisopropylphenyl)-2-(2,6-diisopropylphenylimino)propanamidato)Ni (η$^3$-CH$_2$Ph).

With late transition metal complexes, such as the nickel complex, no second catalyst components are required to achieve typical polymerization activities of 1000-15,000 kg polyethylene/mol catalyst 1 hr at 30° C. The filler does not need to be dried, although better activities are obtained with filler dried in vacuo for 12 hours at 100° C. In a typical procedure, a solution of 8 μmol of the catalyst in totuene or hexane is stirred with 85 mg of dried filler under a N$_2$ atmosphere. This catalyst suspension can be loaded directly into the reactor, or filtered, washed and resuspended in fresh, dry solvent prior to use. Hereinafter, the case using clay as filler will be explained, because clay is one of the typical fillers.

In other embodiments, early transition metal catalysts can be used as the first catalyst component to generate composites, where the metal component of the catalyst can be any early transition metal, such as titanium, zirconium, hafnium, vanadium, niobium, tantalum, chromium, molybdenum, tungsten. Any of a variety of alkyl or substituted alkyl ligands can be used, particularly those which lack alpha-hydrogens, such as neopentyl, neosilyl, benzyl, adamantyl, Which are stable in the form $MR_x$ (where M is the metal, R is the alkyl ligand, and x is the number of alkyl ligands (from 3 to 6, usually 4).

In a preferred embodiment, an alkylaluminum second catalyst component can be advantageously used, that is active in olefin polymerization when supported on clay, in combination with early transition metal first catalyst components, as disclosed above. Preferred second catalyst components are trialkylaluminum or an alkylaluminoxane. A particularly preferred second catalyst component is triisobutylaluminum (TIBA). The second catalyst component can be added first to filler to remove adsorbed water and passivate the clay surface. The second catalyst component is also able to cap many of the silanol groups on the clay surface, which would otherwise catalyze polymer decomposition and deactivate early transition metal catalysts.

More extensive and more robust capping of the silanol groups can be achieved by converting them to trimethylsilyl groups to yield TMS-capped-LiMMT (TMS-clay). This achieved by stirring a suspension of LiMMT in neat chlorotrimethylsilane for 2 hours under $N_2$. The volatiles can be removed either under vacuum at 100° C. for 16 hours, or by washing with fresh solvent. Activities for ethylene and propylene polymerization remain the same order of magnitude when TMS-LiMMT treated with the second catalyst component is substituted for the second catalyst component-non-TMS modified LiMMT. Polymerization with TMS-LiMMT and either early or late transition metal first catalyst components can also proceed without the use of the second catalyst component, although activities are not as high. The clay can also be capped with other silylating agents or treated with Brønsted bases (e.g., tertiary amines or phosphines).

When an olefin is contacted with the activated first catalyst component-filler combination, the olefin polymerizes to form a composite material containing platelets of an acid-treated filler dispersed in the polyolefin matrix. It is believed that Lewis acid sites, on certain acid-treated layered fillers, activate the catalyst to produce polymer between the layers of the layered filler and thereby separate or exfoliate such layers to a greater degree into the developing polymer matrix.

Preferably, the olefin used in the instant invention is selected from the group of olefins having from two to ten carbon atoms. Such olefins include, for example, styrene, divinylbenzene, norbornene, ethylene, propylene, hexene, octene, butadiene and mixtures thereof. Thus, the polymer product of or by way of the instant invention may be, for example, a polyethylene, a polypropylene, a thermoplastic elastomer, or a synthetic rubber. It is also possible that larger monomers (macromonomers) are formed in situ and incorporated into the polymer.

In a preferred embodiment, the olefin is ethylene or propylene. In another preferred embodiment, the olefin is a combination of ethylene and an α-olefin, e.g., 1-hexene.

Preferably, the weight % of layered filler in the composite material is at least 0.5%. In a preferred embodiment, sufficient silicate is used to constitute at least 30 weight % of the composite to prepare a highly silicate-loaded composite masterbatch. A predetermined amount of one or more olefinic polymers can be blended with the composite masterbatch to obtain a composite material having a desired amount of silicate loading, e.g., from 0.1 to 20 weight %.

In a particularly preferred embodiment, a flame retardant polyethylene composite is formed by treating montmorillonite with an alkylaluminum second catalyst component, and then with a tetrabenzylzirconium first catalyst component, that becomes activated for ethylene polymerization when in contact with the clay, and contacting ethylene with the activated catalyst-clay combination.

Polymerization of ethylene or copolymerization of ethylene with an α-olefin such as 1-hexene occurs at temperatures from 10 to 70° C., preferably between 20 and 50° C. Since the polymerization is highly exothermic, it is desirable to control the temperature with a heat exchanger to prevent overheating and decomposition of the catalyst above 70° C. The polymerization can be terminated by exhaustion of monomer, by venting unreacted monomer, or by quenching the reaction with a chain-terminating agent, such as hydrogen gas, carbon monoxide pr a polar comonomer.

Figure 1:
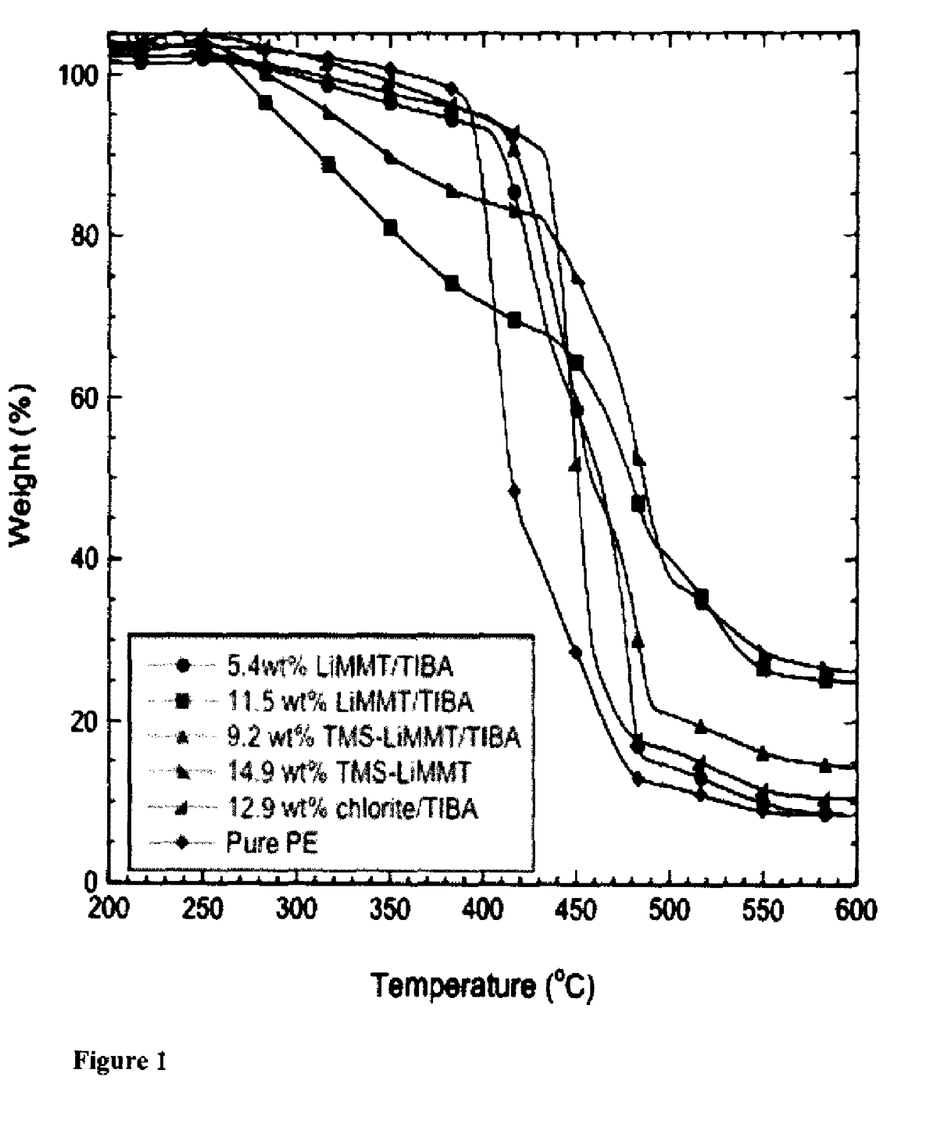
FIG. 1 is a TGA graph showing decomposition of PE/clay composites in air.

Thermal stability of polyolefin/clay composites: The thermal stability of polyethylene (PE)/clay composites was assessed by thermogravimetric analysis (TGA). The TGA experiments were performed in air as the temperature was ramped from 25 to 600° C. at a rate of 20° C./min (FIG. 1). The onset of decomposition for the composite materials occurs at temperatures similar to that seen for pure PE made using the same catalyst activated by a homogeneous Lewis acid, $B(C_6F_5)_3$, in the absence of clay. The TGA graphs show that aerobic polymer decomposition occurs in at least two stages. For pure PE, the first stage is barely detectable; most of the mass loss occurs in the second stage. For the composites, the first stage extends to higher temperatures, resulting in slightly more mass loss for materials with <10 wt % clay, and considerably more for materials with >10 wt % clay. The second stage of decomposition occurs at substantially higher temperatures for all PE/clay composites, indicating that they are more thermally stable than pure PE, even at low clay loadings.

Flammability of polyolefin/clay composites: A modified char test was used to evaluate flammability. Compression-molded bars (60×6×3 mm) were clamped vertically and ignited at the top with a butane lighter for 7 sec. The amount of time required to either self-extinguish or burn completely was recorded.

Figure 2:
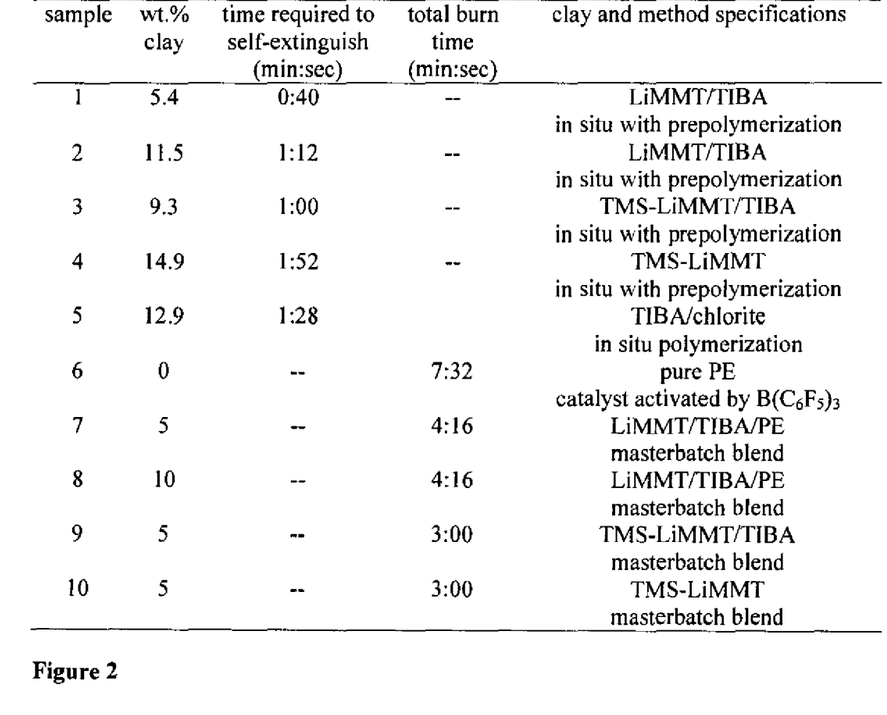
FIG. 2 shows a table of char tests on PE-clay composites.
Figure 3:
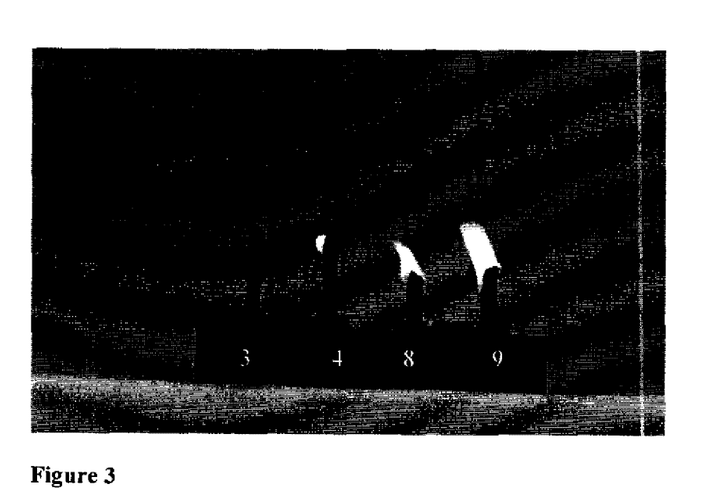
FIG. 3 shows a photograph of char test for PE-clay composites, recorded 1:20 min after ignition. Sample numbers correspond to run numbers in FIG. 2.

The results of char tests with PE/clay composites are summarized in FIG. 2, and a photograph of a char test with a variety of TMS-clay-containing PE samples is shown in FIG. 3. Samples 1-5 are composites prepared by in situ polymerization, while samples 7-10 are composite materials made by the masterbatch blending method. Samples 7-8 were blended from a 52.8 wt % LiMMT/PE masterbatch, sample 9 was made with a 57.0 wt % masterbatch containing TIBA-treated TMS-LiMMT, and sample 10 was blended from a 50.8 wt. % masterbatch containing only TMS-LiMMT (no TIBA).

All of the PE composites, whether made by in situ polymerization or by the masterbatch method, resisted ignition compared to PE containing no clay Materials made by in situ polymerization, with or without TMS-capping (samples 1-5), self-extinguished. Samples 1-4 formed char on the surface of the bar. The formation of char prevents diffusion of combustible volatiles that sustain the flame [2]. The material with the lowest clay loading (sample 1) had the shortest self-extinguishing time. However, the blended materials (samples 7-10) burned faster than PE alone (sample 6) and generated a lot of black smoke.

Figure 4:
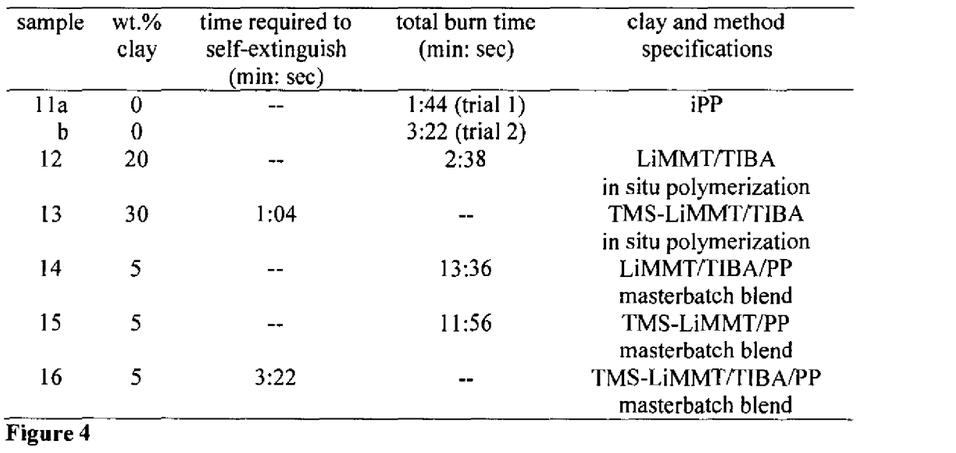
FIG. 4 shows a table of char tests on PP-clay composites.
Figure 5:
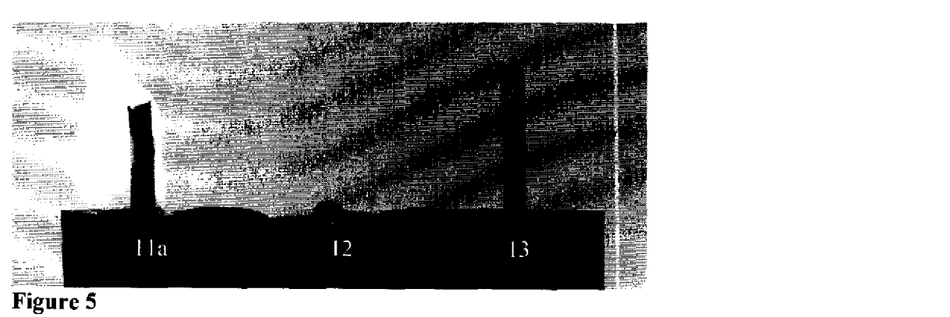
FIG. 5 shows a photograph of char tests for PP-clay composites prepared by in situ polymerization, recorded 1:50 mins after ignition. Sample numbers correspond to run numbers in FIG. 4.
Figure 6:
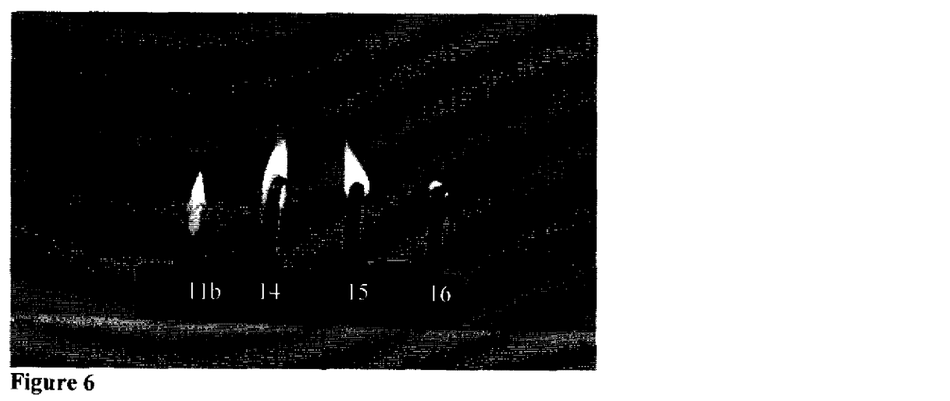
FIG. 6 shows a photograph of char tests for PP-clay composites, recorded 3:00 mins after ignition. Sample numbers correspond to run numbers in FIG. 4.

The results of char tests with polypropylene (PP)/clay composites are summarized in FIG. 4. Representative photographs of the char tests are presented in FIGS. 5 and 6. Samples 11a and 11b were performed with bars of isotactic PP containing no clay. Two bars with high clay loadings, 20 wt % LiMMT/TIBA (sample 12) and 30 wt % TMS-LiMMT (sample 13), were made by in situ polymerization. Three bars were made by the masterbatch method, blended with isotactic PP to 5 wt % clay: sample 14 was blended from a 42.3 wt % LiMMT/TIBA/PP composite; sample 15 was blended from a 76.9 wt % TMS-LiMMT/PP composite; and sample 16 was blended from a 35.1 wt % TMS-LiMMT/TIBA/PP composite.

After ignition, sample 11a began to melt, causing liquid polymer to drip down the side. The sample burned continuously for 1:44 min, until the flame reached the base and was extinguished manually. The LiMMT/TIBA-containing composite (sample 12) did not drip but took only slightly longer (2:38 min) for the flame to reach the base, when it was extinguished manually. On the other hand, the TMS-LiMMT/TIBA/PP composite (sample 13) self-extinguished 1:04 min after ignition. At the end of the experiment, char was observed covering the top of both composites formed by in situ polymerization. Capping of the Brønsted acid sites, either by TIBA or TMS, retards catalytic decomposition of the polymer to smaller hydrocarbon fragments. The isotactic PP bar (sample 11b) took the shortest time to burn to the bottom of samples 11b and 14-16 in FIG. 6.

Unlike the blended PE composites, the blended PP composites showed flame retardant properties. All of the PP-masterbatch blends (samples 14-16) burned slower than PP containing no clay. In addition, the material containing TMS-LiMMT/TIBA self-extinguished after 3:22 min.

As evident from the above, the flame retardant composites can be made directly, or using a masterbatch with high clay loading (e.g., >50 wt %) which is subsequently blended with pure polymer (polyethylene, polypropylene, copolymers of ethylene with other α-olefins, etc) to create composites with the desired clay loading. The method can be used for composites of homopolymers such as ethylene and propylene, copolymers of ethylene with other α-olefins or with functionalized monomers such as styrenes or norbornenes.

The following examples will illustrate best practices of the invention.

Example 1

A solution of TIBA (2.0 g of 1.0 M in hexanes), a second catalyst component, was added to LiMMT (1.3 g) in 15 g toluene, and a yellow solution of the air-sensitive first catalyst component, $Zr(CH_2Ph)_4$ (50 mg in 10 g toluene) was mixed with the LiMMT/TIBA slurry for 15 mins at 20° C. The slurry was washed twice, by removal of excess solvent, resuspension in 20 g of fresh toluene, and stirring for 15 mins. After the final removal of excess solvent, the slurry was resuspended in 70 g fresh toluene, and placed inside a batch polymerization reactor. The reactor was pressurized with 100 psi ethylene at 25° C. and prepolymerized for 15 min. The temperature was increased to 40° C. and the polymerization allowed to proceed for an additional 45 mins. The reaction yielded 23.9 g of PE with a clay content of 5.4 wt %.

Figure 7:
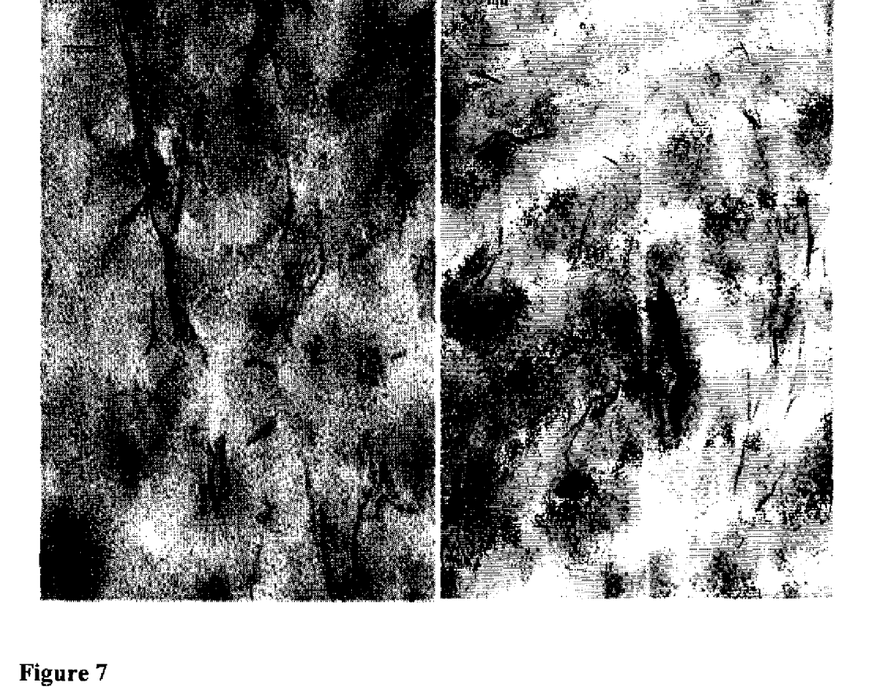
FIG. 7 shows TEM images of a 5.4 wt % LiMMT/PE composite prepared by in situ polymerization.

Typical polymerization activities are 150 kg PE/mol catalyst/hr at 40° C. and 30 kg PP/mol catalyst/hr at 50° C. Polymerization of ethylene is conducted between and 60° C., preferably between 40 and 50° C. Since the polymerization is highly exothermic, it is desirable to control the reactor temperature with a heat exchanger to prevent overheating and decomposition of the catalyst above 70° C. Ethylene is added on demand at 100 psi once the temperature is equilibrated. Typical clay loading after a 30 min polymerization at 40° C. is 15 wt %. In order to achieve a lower clay loading material (<10 wt %), a pre-polymerization step is implemented. Ethylene is added at 25° C. for 15 min, then the temperature is raised to 40° C. for 45 min to obtain a 5 wt % PE/clay composite. Exfoliation of the clay layers is shown in the transmission electron microscopy (TEM) images, FIG. 7. Individual clay sheets are visible in profile as dark lines against the light gray PE background.

Example 2

Figure 8:
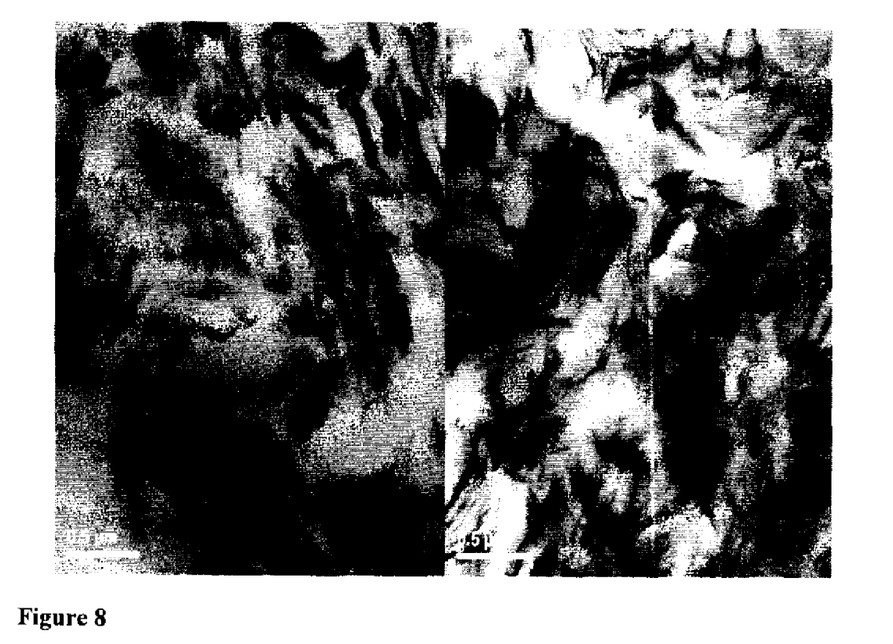
FIG. 8 shows TEM images of a 15 wt % LiMMT/PP composite prepared by in situ polymerization.

The procedure of Example 1 can be repeated except that polymerization is carried out using propylene. Polymerization is conducted between 30 and 60° C., preferably between 40 and 50° C. Since the polymerization is highly exothermic, it is desirable to control the reactor temperature with a heat exchanger to prevent overheating and decomposition of the catalyst above 70° C. Typical clay loading for a 30 min polymerization at 50° C. is 40 wt %, but loadings as low as 15 wt % have been obtained. Partial exfoliation of the clay layers at 15 wt % loading is shown in the TEM images in FIG. 8.

Example 3

LiMMT (2.5 g) was suspended in chlorotrimethylsilane (10 mL), and stirred at 20° C. for 2 hours. The volatiles were removed by heating at 100° C. under dynamic vacuum (16 hours at ≦10-4 Torr), then the solid was transferred to a $N_2$-filled glove box. A solution of TIBA (2.0 g of 1.0 M in hexanes) was added to the TMS-capped clay in 15 g hexanes, and a yellow solution of the air-sensitive first catalyst component, $Zr(CH_2Ph)_4$ (200 mg in 10 g hexanes) was mixed with the TMS-capped clay/TIBA slurry for 15 mins at 20° C. The slurry was washed twice, by removal of excess solvent, resuspension in 20 g of fresh hexanes, and stirring for 15 mins. After the final removal of excess solvent, the slurry was resuspended in 70 g fresh hexanes, and placed inside a batch polymerization reactor, whose temperature was equilibrated at 50° C. The reactor was pressurized with 140 psi propylene and polymerization was allowed to proceed for 60 mins. The reaction yielded 8.9 g of polypropylene with a clay content of 30 wt %.

Example 5

PP/clay composites prepared by the masterbatch blending method are flame retardant materials. The masterbatch was made using the method described above for the PP/LiMMT composite, but with a TMS-clay treated with TIBA and 30 min polymerization time. A physical mixture of the 35.1 wt % TMS-clay-TIBA/PP composite (0.57 g) and pure PP (3.43 g) was blended in a twin screw extruder at 170° C. for 8 min then extruded.

Example 6

The clay can be ion-exchanged with cations other than Li. Thus, the procedure of Example 1 can be repeated except that the clay is cation-exchanged with Na.

Example 7

The acid treatment can be applied to clays other than montmorillonite, or to layered non-clay materials. Thus, the procedure of Example 1 can be repeated except that the acid treatment can be applied to layered aluminum phosphate.

Example 8

In manner similar to Example 6, the procedure of Example 1 can be repeated except that the acid treatment can be applied to zirconium phosphate.

Example 9

The method can be used for composites of copolymers of ethylene with other α-olefins or with functionalized monomers. Thus, the procedure of Example 1 can be repeated except that the olefin is styrene.

Example 10

In manner similar to Example 7, the procedure of Example 1 can be repeated except that the olefin is norbornene.

Example 11

The ethylene pressure can be varied in order to alter the branch content of the polymer. Thus, the procedure of Example 1 can be repeated except that the ethylene pressure is increased to 3500 kPa.

Example 12

Chlorite was treated with TIBA (2.0 g of 1.0M in hexanes) prior to the deposition of tetrabenzylzirconium. Chlorite requires less tetrabenzylzirconium catalyst (10 mg/1.3 g clay) for polymerization compared to LiMMT (50 mg/1.3 g clay). The reactor was pressurized with 100 psi ethylene. Polymerization at 40° C. for 30 min yielded a white shred like material (10.1 g) with 13% clay loading. The activity for that polymerization is 918 kg/mol/h. The clay layers in the chlorite activated materials are not exfoliated. The chlorite material did not form any char during the char test but it self-extinguished after 1:28.

Example 13

A 5.7 wt % PE/LiMMT composite made with the eta-3 Ni catalyst by in situ polymerization was also shown to self-extinguish. It self-extinguished after 3.51. [not shown in Figures]. To make the composite, catalyst solution (9.6 micromol in 1 g of toluene) was added to a slurry of 200 mg of LiMMT in 100 g of toluene. The slurry was placed inside a batch polymerization reactor. The temperature was equilibrated at 40° C. and ethylene (100 psi) was added on demanded for 30 min. The reaction yielded 5.3 g of PE with a clay content of 5.7 wt %.

Example 14

Figure 9:
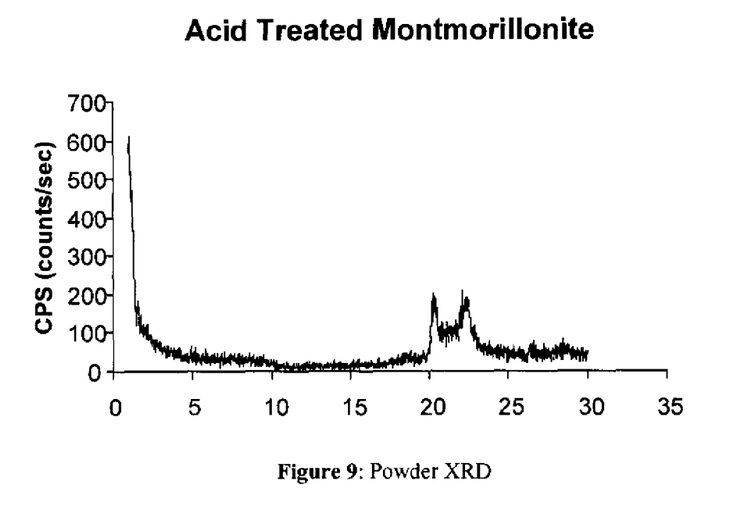
FIG. 9 shows an X-ray diffraction pattern of acid-treated montmorillonite.

Acid-treated lithium montmorillonite was prepared by stirring a suspension of untreated clay in a solution of $Li_2SO_4$ and concentrated $H_2SO_4$ for 5 hours. This material retains its sheet-like structure but the interlayer association is greatly disrupted, as shown by the absence of an XRD (001) reflection at 2θ=7°, as shown in FIG. 9.

85 mg Acid-treated lithium montmorillonite was partially dehydrated by heating at 100° C. under a dynamic vacuum (12 hours at ≦10-4 Torr) and then transferred to a $N_2$-filled glove box. A dark orange solution of the air-sensitive catalyst, LNi($\eta^3$-CH2Ph) where L=N-(2,6-diisopropylphenyl)-2-(2, 6-diisopropylphenylimino)propanamidato (4 mg in 1 g toluene) was mixed with a slurry of 85 mg clay suspended in 26 g toluene for 30 mins at room temperature inside a batch polymerization reactor thermostated at 25° C. The reactor was pressurized with 689 kPa $C_2H_4$ and polymerization proceeded for 70 mins. The reaction yielded 3.2 g of polyethylene with Mw=1,089,000 g/mol, a polydispersity index of 2.8 and a clay content of 2.6 wt %.

Figure 10:
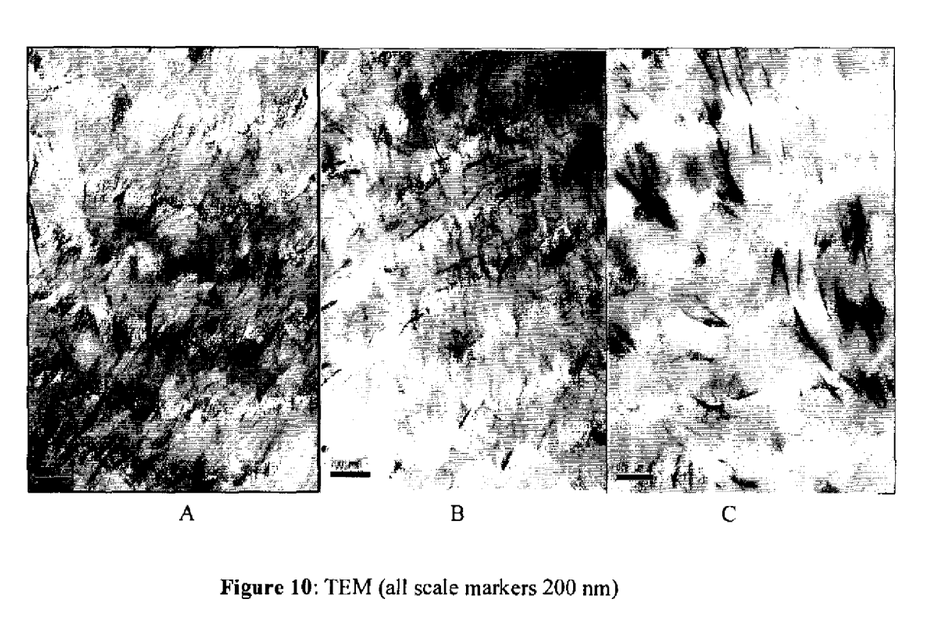
FIG. 10 shows TEMs of polyethylene-clay composites with (A) 2.6 wt. % clay, (B) 10.6 wt. % clay, and (C) ethylene/1-hexene copolymer with 2.4 wt. % clay.

Evidence for nanocomposite formation is shown in the transmission electron microscopy (TEM) image of FIG. 10A. Individual clay sheets are visible in profile as dark lines against the light gray polyethylene background.

Example 15

The procedure of Example 14 was repeated except that 500 mg acid-treated lithium montmorillonite was used. The result was a yield of 4.7 g of polyethylene Mw=1,146,000 g/mol, a polydispersity index of 2.7 and a clay content of 10.6 wt %. Evidence for nanocomposite formation is shown in the transmission electron microscopy (TEM) image of FIG. 10B.

Example 16

The procedure of Example 14 was repeated except that 4 g of the solvent, toluene, was replaced with 4 g of 1-hexene, and polymerization proceeded for 30 mins. The reaction yielded 3.6 g of polyethylene with a clay content of 2.4 wt %. Evidence for nanocomposite formation is shown in the transmission electron microscopy (TEM) image of FIG. 10C.

The images of FIG. 2 show that most of the clay is exfoliated. Groups of less than 5 associated, possibly intercalated, clay sheets are also present. High clay dispersion was observed up to 11 wt % loading, and in the presence of co-monomer.

Example 17

The clay can be cation-exchanged with cations other than Li. Thus, the procedure of Example 14 can be repeated except that the clay is cation-exchanged with Na.

Example 18

The acid treatment can be applied to clays other than montmorillonite, or to layered non-clay materials. Thus, the procedure of Example 14 can be repeated except that the acid treatment can be applied to layered aluminum phosphate.

Example 19

In manner similar to Example 18, the procedure of Example 14 can be repeated except that the acid treatment can be applied to zirconium phosphate.

Example 20

The structure of the catalyst can be varied via the nature of the donor atoms and the substituents on the ligand L, the initiating group R and the ancillary ligand S. Thus, the procedure of Example 14 can be repeated except that the late transition metal Pd may be substituted for the late transition metal Ni.

Example 21

In manner similar to Example 20, the procedure of Example 14 can be repeated except that the late transition metal Pt may be substituted for the late transition metal Ni.

Example 22

In manner similar to Example 20, the procedure of Example 14 can be repeated except that the late transition metal Fe may be substituted for the late transition metal Ni.

Example 23

In manner similar to Example 20, the procedure of Example 14 can be repeated except that the late transition metal Co may be substituted for the late transition metal Ni.

Example 24

The method can be used for composites of homopolymers other than polyethylene. Thus, the procedure of Example 14 was repeated except that the olefin was propylene and the catalyst was $LNi(\eta^1-CH_2Ph)(PMe_3)$ where L=2-methylene-3-(2,6-diisopropylphenylimino)propoxide. A mixture of the catalyst (8 mg in 1 g toluene) and bis(1,5-cyclooctadiene) nickel (30 mg in 2 g toluene) was added to a slurry of 450 mg clay suspended in 55 g toluene. The reactor was pressurized with 937 kPa $C_3H_6$ and the polymerization proceeded for 180 mins. The reaction yielded 1.4 g of a polypropylene composite with a clay loading of 32%.

Example 25

The method can be used for composites of copolymers of ethylene with other α-olefins or with functionalized monomers. Thus, the procedure of Example 14 can be repeated except that the olefin is styrene.

Example 26

In manner similar to Example 25, the procedure of Example 14 can be repeated except that the olefin is norbornene.

Example 27

The ethylene pressure can be varied in order to alter the branch content of the polymer. Thus, the procedure of Example 14 can be repeated except that the ethylene pressure is increased to 3500 kPa.

Example 28

The procedure of Example 14 can be used to make a masterbatch with high clay loading which then can be blended with pure polymer (polyethylene, polypropylene, copolymers of ethylene with other alpha-olefins, etc) to create composites with the desired clay loading. Thus, the procedure of Example 14 can be repeated except that a slurry of 0.25 g clay suspended in 40 g toluene can be treated with 1 mg of the catalyst of Example 14 (in 1 g toluene). The reactor can be pressurized with 689 kPa $C_2H_4$ and polymerization can proceed for 4 mins, to yield polyethylene having a clay content of at least 40 wt. %.

Example 29

500 mg of neat second catalyst component trimethylaluminum (TMA) was added dropwise to a rapidly stirred suspension of 3 g acid-treated montmorillonite in 10 g toluene. The clay was then filtered and washed three times with fresh toluene to remove unreacted TMA. A portion of the clay (626 mg) was resuspended in 70 g toluene and transferred to a 300 mL Parr reactor. 1 g of catalyst solution (16 mg $LNi(\eta^3$-CH2Ph) catalyst where L=N-(2,6-diisopropylphenyl)-2-(2,6-diisopropylphenylimino)propanamidato in 3 g toluene) was added, the reactor was sealed and removed from the glove box. After thermal equilibration at 40° C. with stirring, ethylene was added on demand at 100 psi for 35 minutes. The activity is similar to that of the catalyst supported on unmodified clay, under similar conditions in the same reactor. 5.6 g of material (containing 11.1 wt % clay) was recovered. It appeared fluffier (i.e., less granular) than materials previously produced using clay without TMA modification.

Figure 11:
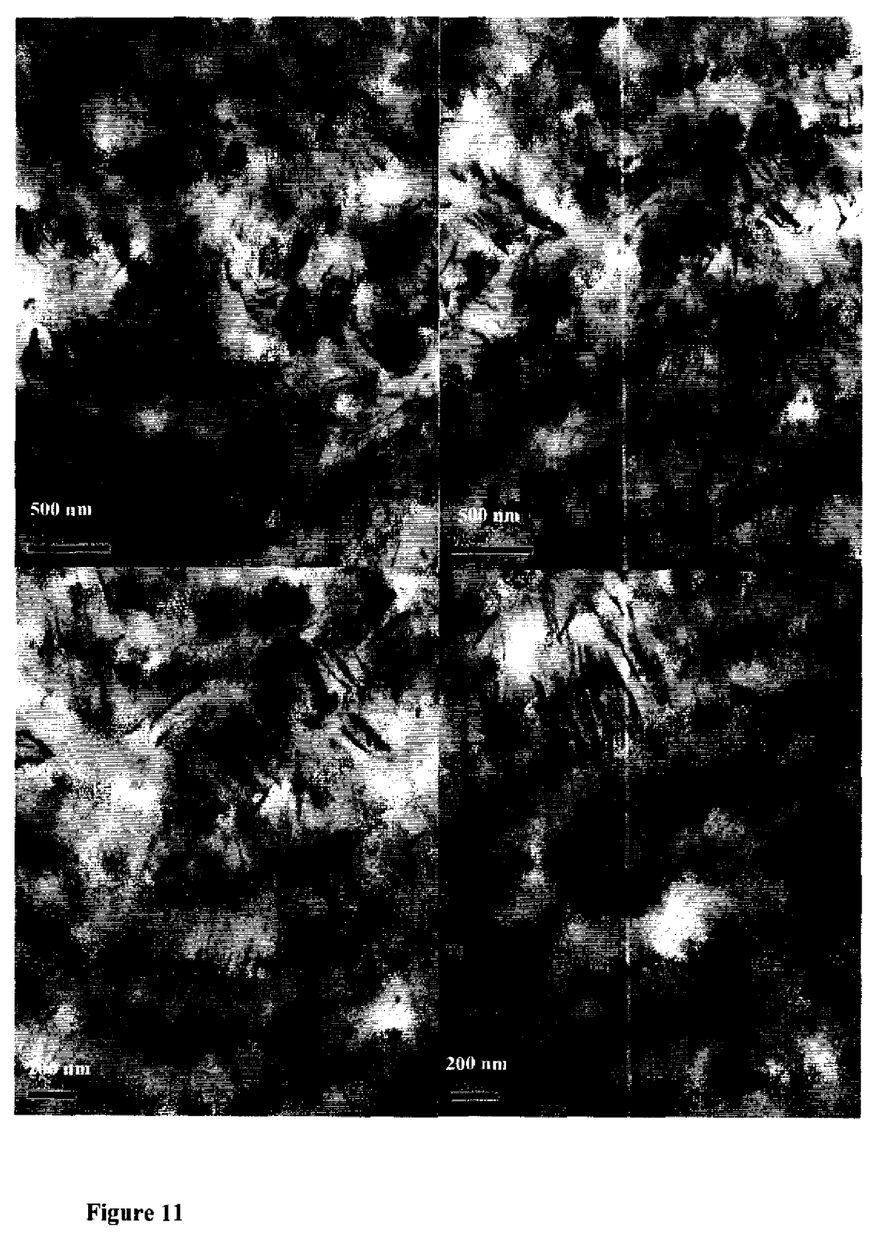
FIG. 11 shows TEM images of an 11.1 wt % clay-polyethylene composite produced with a trimethylaluminum-modified clay.

FIG. 11 shows TEM images of an 11.1 wt % clay-polyethylene composite produced with TMA-modified clay catalyst. While the clay is well-distributed in the polymer matrix, it is not highly exfoliated. This may be a consequence of TMA-induced catalyst leaching, resulting in polymerization other both on and off the surface of the clay. The fluffy appearance of the polymer is consistent with this explanation, since it resembles materials produced by homogeneous acid-activated catalysts.

Example 30

31.1 g Acid-treated lithium montmorillonite was partially dehydrated by heating at 200° C. under a dynamic vacuum (12 hours at ≦10-4 Torr). The clay was then suspended in toluene (100 g) and transferred, under $N_2$, to a 2 L autoclave reactor containing 1 L toluene. A solution of the catalyst, $LNi(\eta^3-CH_2Ph)$ where L=N-(2,6-diisopropylphenyl)-2-(2,6-diisopropylphenylimino)propanamidato (16 mg in 5 g toluene) was transferred to the burst valve of the reactor. The reactor was thermostatted at 40° C. The catalyst solution was pushed into the reactor with ethylene at 1800 kPa, creating the clay-supported catalyst in situ. The polymerization was allowed to proceed isothermally for 30 mins, The reaction yielded 242 g polyethylene with a clay content of 13.2 wt. %.

Example 31

0.5 g Acid-treated lithium montmorillonite was partially dehydrated by heating at 100° C. under a dynamic vacuum (12 hours at ≦10-4 Torr) and then transferred to a $N_2$-filled glove box. A solution of the catalyst, tetrabenzylzirconium (140 mg in 2 g toluene) was mixed with a slurry of 2.5 g clay suspended in 80 g toluene for 30 mins at room temperature inside a batch polymerization reactor thermostated at 55° C. The reactor was pressurized with 965 kPa $C_3H_6$ and polymerization was allowed to proceed for 60 mins. The reaction yielded 8.65 g polypropylene with a clay content of 28.9 wt. % and a melting point of 148° C.

Example 32

430 mg Acid-treated lithium montmorillonite was partially dehydrated by heating at 100° C. under a dynamic vacuum (12 hours at $\geq 10^{-4}$ Torr) and then transferred to a N$_2$-filled glove box. A solution of the catalyst LNi($\eta^1$-CH$_2$Ph)PMe$_3$ where L=3-(2,6-diisopropylphenylimino)-butan-2-one (16 mg in 2 g toluene) and Ni(COD)$_2$ (37 mg in 1.5 g toluene) were mixed with a slurry of 430 mg clay suspended in 40 g toluene for 30 mins at room temperature. The clay-supported catalyst was allowed to settle and the solvent decanted. 60 g fresh toluene and additional Ni(COD)$_2$ (38 mg in 1.5 g toluene) was then added. The catalyst suspension was then transferred to a batch polymerization reactor and thermostatted at 25° C. The reactor was pressurized with 965 kPa C$_3$H$_8$ and polymerization allowed to proceed for 180 mins. The reaction yielded 1.3 g polypropylene with a clay content of 33.1 wt. %.

REFERENCES

The following publications are hereby incorporated by reference:

1. T. G. Gopakumar, J. A. Lee, M. Kontopoulou and J. S. Parent. *Polymer* 43 (2002) 5483-5491.
2. S. S. Ray and M. Okamoto. *Prog. Polym. Sci.* 28 (2003) 1539-1641.
3. K. Weiss, C. Wirth-Pfeifer, M. Hofmann, S. Botzenhardt, H. Lang, K. Bruning and E. Meichel. *J. Mol. Catal. A: Chem.* 182/183 (2002) 143-149.
4. E. G. Howard, R. D. Lipscomb, R. N. MacDonald, B. L. Glazar, C. W. Tullock and J. W. Collette. *Ind. Eng. Chem. Prod. Res. Dev.* 20 (1981) 421-428.
5. G. G. Hlalky. *Chem. Rev.* 1000 (2000) 1347-1376.
6. J. Tudor, L. Willington, D. O'Hare and B. Royan. *Chem. Commun.* (1996) 2031-2032.
7. Y. Suga, Y. Maruyama, E. Isobe, T. Suzuki and F. Shimizu. U.S. Pat. No. 5,308,811 (1994).
8. Y. Ishihama, E. Isobe, Y. Maruyama, T. Sagae, Y. Suga and Y. Uehara. EP Patent 0683180 (1995).
9. T. Sun and J. M. Garces. *Adv. Mater.* 14 (2002) 128-130.
10. J. S. Bergman, H. Chen, E. P. Giannelis, M. G. Thomas and G. W. Coates. *Chem. Commun.* (1999) 2179-2180.
11. Y.-H. Jin, H.-J. Park, S.-S. Im, S.-Y. Kwak and S. Kwak. *Macromol. Rapid Commun.* 23 (2002) 135-140.
12. T. Tang, L. Wei and B. Huang. U.S. Pat. No. 6,649,713 (2003).
13. J. Heinemann, P. Reichart, R. Thomann and R. Mulhaupt. *Macromol. Rapid Commun.* 20 (1999) 423-430.
14. P. Dubois, M. Alexandre and R. Jerome. *Macromol. Symp.* 194 (2003) 13-26.
15. M. Alexandre, P. Dubois, R. Jerome, M. Gareia-Marti, T. Sun, J. M. Garces, D. M. Millar and A. Kuperman. Patent WO 99/47598 (1999).
16. H. G. Jeon, H.-T. Jung, S. W. Lee and S. D. Hudson. *Polymer Bull.* 41 (1998) 107-113.
17. A. Usuki, M. Kato, A. Okada and T. Kurauchi. *J. Appl. Polym. Sci.* 63 (1997) 137-139.
18. M. Kawasumi, N. Hasegawa, M. Kato, A. Usuki and A. Okada. *Macromolecules* 30 (1997) 6333-6338.
19. N. Hasegawa, M. Kawasumi, M. Kato, A. Usuki and A. Okada. *J. Appl. Polym. Sci.* 67 (1998) 87-92.
20. D. Kaempfer, R. Thomann and R. Mulhaupt. *Polymer* 43 (2002)2909-2916.
21. P. H. Nam, P. Maiti, M. Okamoto, T. Kotaka, N. Hasegawa and A. Usuki. *Polymer* 42 (2001) 9633-9640.
22. K. H. Wang, M. H. Choi, C. M. Koo, Y. S. Choi and I. J. Chung. *Polymer* 42 (2001) 9819-9826.
23. N. Hasegawa, M. Okamoto, M. Kawasumi, M. Kato, A. Tsukigase and A. Usuki. *Macromol. Mater. Eng.* 280/281 (2000) 76-79.
24. E. Manias, A. Touny, L. Wu, K. Strawhecker, B. Lu and T. C. Chung. *Chem. Mater* 13 (2001) 3516-3523.
25. M.-S. Hsiao, G.-Y. Chang, S.-Y. Lee and S.-J. Jong. U.S. Pat. No. 6,838,508 (2005).
26. Z. M. Wang, H. Nakajima, E. Manias and T. C. Chung. *Macromolecules* 36 (2003) 8919-8922.
27. S.-S. Hou and K. Schmidt-Rohr. *Chem. Mater.* 15 (2003) 1938-1940.
28. T. Sun, J. M. Garces and Z. R. Jovanovic. International Patent Application Publication No. WO 01/30864 (2001).
29. B. Y. Lee, G. C. Bazan, J. Vela, Z. J. A. Komon and X. Bu. *J. Am. Chem. Soc.* 123 (2001) 5323-5353.
30. Bartholmai, M.; Schartel, B. *Polym. Adv. Technol.* 2004, 15, 355.
31. Beyer, G. *Plastics Additives & compounding*, 2002, 22.
32. Ray, S. S.; Okamoto, M. *Prog. Polym. Sci.* 2003, 28, 1539.
33. Blumstein, A. *J. Polym. Sci.* 1965, A 3, 2665.
34. Burnside, S. D.; Giannelis, E. P. *Chem. Mater.,* 1995, 7, 1597.
35. Giannelis, E. *Adv. Mater.* 1996, 6, 29.
36. Lee, J.; Takekoshi, T.; Giannelis, E. *Mater. Res. Soc. Symp. Proc.* 1997, 457, 513.
37. Zanetti, M.; Camino, G.; Reichart, P.; Mulhaupt, R. *Macromol. Rapid Commun.* 2001, 22, 176.
38. Qin, H.; Zhang, S.; Zhao, C.; Feng, M.; Yang, M.; Shu, Z.; Yang, S. *Polym. Degrad. Stab.* 2004, 85, 807.
39. Morgan, A. B.; Harris, R. H., Jr.; Kashiwagi, T.; Chyall, L. J.; Gilman, J. W. *Fire Mater.* 2002, 26, 247.
40. Zhu, J.; Uhl, F. M.; Morgan, A. B.; Wilkie, C. A. *Chem. Mater.* 2002, 14, 881.
41. Zhao, C.; Qin, H.; Gong, F.; Feng, M.; Zhang S.; Yang, M. *Polym. Degrad. Stab.* 2005, 87, 183.
42. Gilman, J. W. *Appl. Clay Sci.* 1999, 15, 31.
43. Babrauskas, V.; Peacock, R. D. *Fire Safety Journal* 1992, 18, 255-261.
44. Gilman, J.; Kashiwagi, T.; Lomakin, S.; Giannelis, E.; Manias, E.; Lichtenhan J.; Jones, P. *Fire Retardancy of Polymers: the Use of Intumescence*. The Royal Society of Chemistry, Cambridge, 1998.
45. Gilman, J. W.; Jackson, C. L.; Morgan, A. B.; Harris, R., Jr.; Manias, E.; Giannelis, E. P.; Wuthenow, M.; Hilton, D.; Phillips, S. H. *Chem. Mater* 2000, 12, 1866.
46. Yang, F.; Yngard, R.; Nelson, G. L. *J. Fire Sci.* 2005, 23, 209.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:

1. A method for forming a flame retardant composite polymer by olefin polymerization, comprising:
    treating at least one filler, selected from the group consisting of layered silicates and non-silicate compounds, such that the filler's layered structure is disrupted;
    combining said filler with an early or late transition metal first catalyst component that becomes activated for olefin polymerization when in contact with the filler, and
    contacting an olefin with the activated catalyst-filler combination either (a) in the absence of an alkylaluminum second catalyst component or (b) in the presence an alkylaluminum or an alkylaluminoxane second catalyst component when the first catalyst component is an early transition metal catalyst, whereby to form an filler-polyolefin composite incorporating platelets of said filler, and having flame retardant properties.

2. The method of claim 1 in which said filler is a layered filler.

3. The method of claim 1 in which said filler is clay.

4. The method of claim 3 in which said clay is chlorite or montmorillonite.

5. The method of claim 4 in which said montmorillonite is treated by acid whereby to partly disrupt its layered structure.

6. The method of claim 1 in which said filler is treated with a Brønsted base or a silylating agent.

7. The method of claim 1 in which said olefin is a) ethylene, b) propylene or c) a combination of ethylene and an α-olefin.

8. The method of claim 1 in which sufficient filler is used to constitute greater than 0.5 weight % of the composite.

9. The method of claim 1 in which sufficient filler is used to constitute at least 30 weight % of the composite to prepare a high clay-loaded composite masterbatch incorporating platelets of said layered filler.

10. The method of claim 9 including the step of blending a predetermined amount of one or more olefinic polymers with said masterbatch to obtain a composite having a desired amount of loading.

11. The method of claim 1 in which said early or late transition metal catalyst is a non-metallocene catalyst.

12. A method of forming a flame retardant composite polymer by olefin polymerization, comprising:
treating at least one filler, selected from the group consisting of layered silicates and non-silicate compounds;
combining said filler with an early or late transition metal first catalyst component that becomes activated for olefin polymerization when in contact with the filler, and
contacting an olefin with the activated catalyst-filler combination either (a) in the absence of an alkylaluminum second catalyst component or (b) in the presence an alkylaluminum or an alkylaluminoxane second catalyst component when the first catalyst component is an early transition metal catalyst, whereby to form an filler-polyolefin composite incorporating platelets of said filler, and having flame retardant properties, in which said catalyst is a nickel complex bearing an α-iminocarboxamidato ligand.

13. The method of claim 11 in which said catalyst has the general formula I, II, III, IV or V:

(I)

(II)

(III)

(IV)

and (V)

wherein:
M is Ni, Pt, Pd;
A is a π-allyl, a substituted π-allyl, a π-benzyl, a substituted π-benzyl, benzoyl or picolino ligand;
X is N, P or CH;
Y is O, $CH_2$, or S;
L is N or P or a structure that is capable of being a neutral two electron donor ligand;
$L^1$ is a neutral monodentate ligand and $L^2$ is a monoanionic monodentate ligand, or $L^1$ and $L^2$ taken together are a monoanionic bidentate ligand, provided that said monoanionic monodentate ligand or said monoanionic bidentate ligand is capable of adding to said olefin;
B is a bridge connecting covalently an unsaturated carbon and L;
$R^1$, $R^2$, $R^{3A}$ and $R^{3B}$ are the same or different and are each independently hydrogen, hydrocarbyl group, or substituted hydrocarbyl bearing functional group;
the designation:

----- is a single or double bond; and
$R^{3B}$ is nothing when B is connected to L by a double bond.

14. The method of claim 12 in which said α-iminocarboxamidato catalyst is (N-(2,6-diisopropylphenyl)-2-(2,6-diisopropylphenylimino)propanamidato)Ni($\eta^3$-$CH_2$Ph).

15. The method of claim 12 in which said α-iminocarboxamidato ligand is N-phenyl-2-(2,6-dimethylphenylimino)propanamidate.

16. A method of forming a flame retardant composite polymer by olefin polymerization, comprising:
treating at least one filler, selected from the group consisting of layered silicates and non-silicate compounds;
combining said filler with an early or late transition metal first catalyst component that becomes activated for olefin polymerization when in contact with the filler, and
contacting an olefin with the activated catalyst-filler combination either (a) in the absence of an alkylaluminum second catalyst component or (b) in the presence an alkylaluminum or an alkylaluminoxane second catalyst component when the first catalyst component is an early transition metal catalyst, whereby to form an filler-polyolefin composite incorporating platelets of said filler, and having flame retardant properties, in which said catalyst has the formula $MR_x$ where M is an early transition metal, R is an alkyl or substituted alkyl ligand, and x is from 3 to 6.

17. The method of claim 16 in which the metal component is selected from titanium, zirconium, hafnium, vanadium, niobium, tantalum, chromium, molybdenum, and tungsten, the alkyl or substituted alkyl ligand lacks an alpha-hydrogen, and x is 4.

18. The method of claim 17 in which the alkyl or substituted alkyl ligand is selected from neopentyl, neosilyl, benzyl, and adamantyl groups.

19. The method of claim 16 in which said catalyst is tetrabenzylzirconium.

20. A method of forming a flame retardant composite polymer by olefin polymerization, comprising:

treating at least one filler, selected from the group consisting of layered silicates and non-silicate compounds;

combining said filler with an early or late transition metal first catalyst component that becomes activated for olefin polymerization when in contact with the filler, and contacting an olefin with the activated catalyst-filler combination either (a) in the absence of an alkylaluminum second catalyst component or (b) in the presence an alkylaluminum or an alkylaluminoxane second catalyst component when the first catalyst component is an early transition metal catalyst, whereby to form an filler-polyolefin composite incorporating platelets of said filler, and having flame retardant properties, in which the filler is clay and the amount of filler being used constitutes at least 30% weight % of the composite to prepare a highly clay-loaded composite masterbatch incorporating platelets of said clay.

* * * * *